(12) United States Patent
Bossons

(10) Patent No.: US 11,312,428 B2
(45) Date of Patent: Apr. 26, 2022

(54) MOTOR VEHICLE APPARATUS AND METHOD

(71) Applicant: Jaguar Land Rover Limited, Coventry (GB)

(72) Inventor: Ian Bossons, Coventry (GB)

(73) Assignee: JAGUAR LAND ROVER LIMITED, Whitley Coventry (GB)

( * ) Notice: Subject to any disclaimer, the term of this patent is extended or adjusted under 35 U.S.C. 154(b) by 197 days.

(21) Appl. No.: 16/620,315

(22) PCT Filed: Jun. 5, 2018

(86) PCT No.: PCT/EP2018/064695
§ 371 (c)(1),
(2) Date: Dec. 6, 2019

(87) PCT Pub. No.: WO2018/224466
PCT Pub. Date: Dec. 13, 2018

(65) Prior Publication Data
US 2020/0189669 A1 Jun. 18, 2020

(30) Foreign Application Priority Data
Jun. 8, 2017 (GB) ..................................... 1709164

(51) Int. Cl.
*B62D 35/00* (2006.01)
*B62D 37/02* (2006.01)
(52) U.S. Cl.
CPC ............ *B62D 35/007* (2013.01); *B62D 37/02* (2013.01)
(58) Field of Classification Search
CPC ......... B62D 37/02; B62D 37/00; B62D 35/00
See application file for complete search history.

(56) References Cited

U.S. PATENT DOCUMENTS

| 9,403,564 B1 | 8/2016 | Al-Huwaider |
| 2007/0236045 A1 | 10/2007 | Froeschle et al. |
| 2013/0257092 A1 | 10/2013 | Neumann et al. |

FOREIGN PATENT DOCUMENTS

| CN | 103448813 A | 12/2013 |
| DE | 102008024893 A1 | 11/2009 |

(Continued)

OTHER PUBLICATIONS

Patents Act 1977: Combined Search and Examination Report under Sections 17 and 18(3), UKIPO Application No. GB1709163.8, dated Nov. 8, 2017, 8 pp.

(Continued)

*Primary Examiner* — Lori L Lyjak
(74) *Attorney, Agent, or Firm* — Reising Ethington P.C.

(57) ABSTRACT

An active wing apparatus for a vehicle. The apparatus comprises a deployable wing assembly and a lifting means for lifting the assembly when the assembly is deployed. The lifting means comprises two lifting arms each having a first end pivotably coupled to a mounting portion, and a second end pivotably coupled to the wing assembly. The apparatus further comprises a cover panel below the wing assembly arranged to be raised and lowered. The lifting arms are configured to protrude through apertures in the cover panel to enable connection of the wing assembly to the body of the vehicle. The cover panel further comprises a pair of infill cover panels slidably coupled to the cover panel and movable between open and closed conditions. When the apparatus is in a stowed condition, the infill panels assume an open position, and when in a deployed condition, the infill panels assume a closed position.

16 Claims, 13 Drawing Sheets

(56) References Cited

FOREIGN PATENT DOCUMENTS

| DE | 102008036170 A1 | 2/2010 | |
|----|-----------------|--------|---|
| DE | 102012111849 A1 | 6/2014 | |
| DE | 102014117928 A1 | 2/2016 | |
| EP | 1840016 A1 | 10/2007 | |
| GB | 2545401 A | 6/2017 | |
| JP | 7-35269 U | 6/1995 | |
| JP | 7-196055 A | 8/1995 | |
| JP | 2007-45267 A | 2/2007 | |
| WO | WO-2017073450 A1 * | 5/2017 | ........... B60Q 1/2696 |

OTHER PUBLICATIONS

International Search Report and Written Opinion of the International Searching Authority, International Application No. PCT/EP2018/064692, dated Sep. 25, 2018, 11 pp.

Patents Act 1977: Combined Search and Examination Report under Sections 17 and 18(3), UKIPO Application No. GB1709164.6, dated Nov. 7, 2017, 6 pp.

International Search Report and Written Opinion of the International Searching Authority, International Application No. PCT/EP2018/064695, dated Sep. 25, 2018, 11 pp.

* cited by examiner

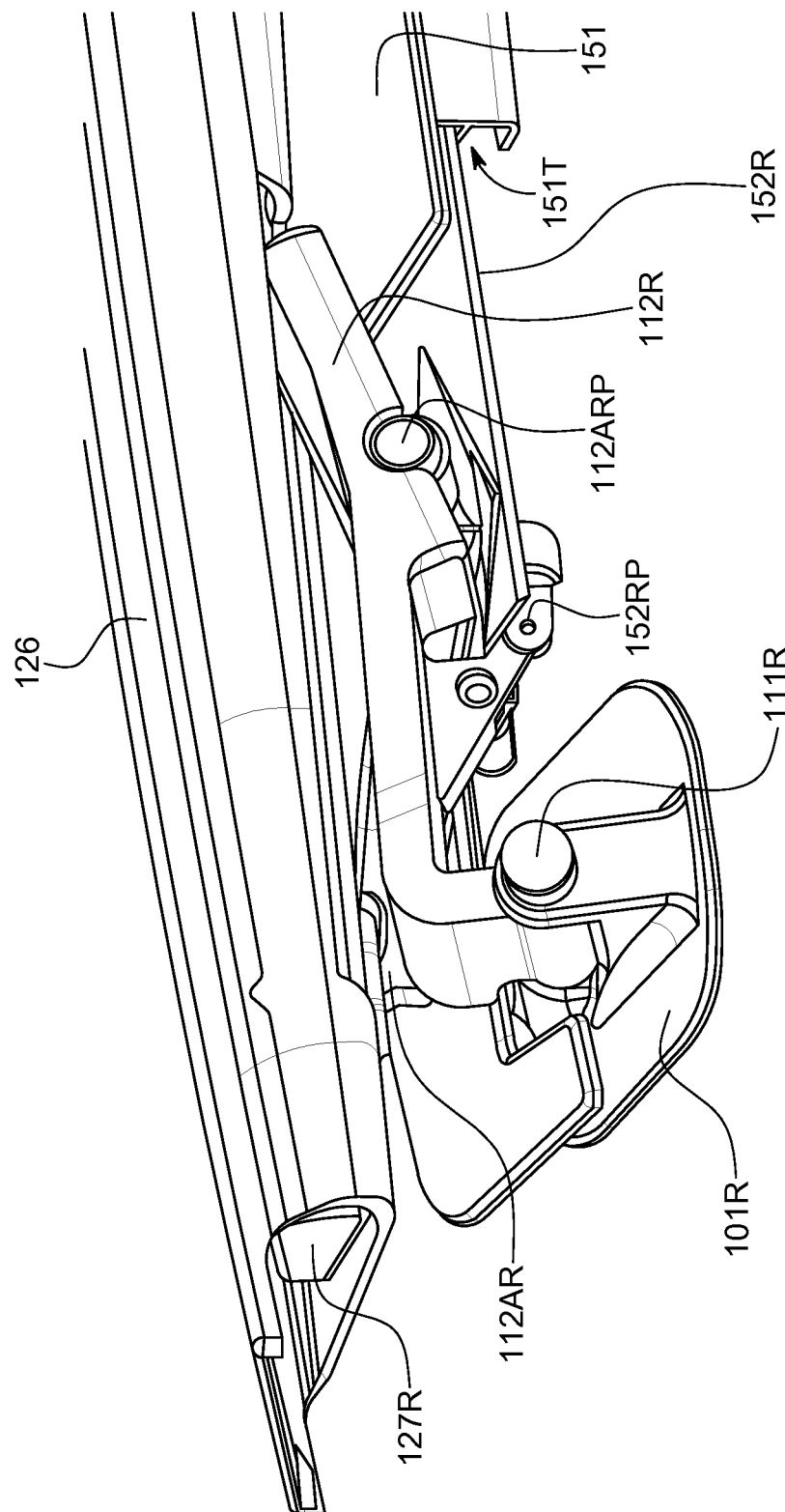

MOTOR VEHICLE APPARATUS AND METHOD

RELATED APPLICATIONS

This application is a 35 U.S.C. § 371 national stage application of PCT Application No. PCT/EP2018/064695, filed on Jun. 5, 2018, which claims priority from Great Britain Patent Application No. 1709164.6, filed on Jun. 8, 2017, the contents of which are incorporated herein by reference in their entireties. The above-referenced PCT International Application was published in the English language as International Publication No. WO 2018/224466 A1 on Dec. 13, 2018.

TECHNICAL FIELD

The present disclosure relates to a motor vehicle active wing apparatus.

BACKGROUND

It is known to provide a motor vehicle having a rear mounted wing for generating a down force when the vehicle is travelling at speed. The down force increases the force between wheels of the vehicle and the driving surface, enhancing traction. In some vehicles the wing is fixed whilst in some known vehicles the wing is retractable. Packaging constraints can make stowing retractable wings problematic. This is particularly the case in vehicles that are shaped for enhanced aerodynamic performance, such as sports cars.

It is against this background that the present invention has been conceived. Embodiments of the invention may provide an apparatus, vehicle, controller, method, carrier medium, computer program product, computer readable medium or processor which mitigate one or more problems associated with known active wing apparatus. Other aims and advantages of embodiments of the invention will become apparent from the following description, claims and drawings.

SUMMARY OF THE INVENTION

In an aspect of the invention for which protection is sought there is provided active wing apparatus for a motor vehicle, the apparatus comprising a wing assembly configured to reversibly deploy upwardly in a first direction from a stowed condition to a deployed condition, the apparatus comprising lifting means for lifting the wing assembly when the apparatus is reversibly deployed in the first direction from the stowed condition to the deployed condition, wherein the lifting means comprises at least two lifting arms, each having respective first and second ends, the second end of each lifting arm being pivotably coupled to the wing assembly, the first end of each lifting arm being pivotably coupled to a lifting arm anchor portion that is substantially fixed with respect to a portion of a body of the vehicle, wherein rotation of the lifting arms about the first and second ends causes lifting of the wing assembly.

the apparatus further comprising a cover panel provided below the wing assembly, the cover panel being arranged to be raised and lowered between stowed and deployed conditions when the apparatus transitions between the stowed and deployed conditions, in the deployed condition the cover panel being arranged to at least partially cover a recess formed in a body portion of the vehicle within which at least a portion of the apparatus is provided when the apparatus is in the stowed condition, the lifting arms being configured to protrude through cover panel apertures formed in the cover panel to enable connection of the wing assembly to the portion of the vehicle body, the cover panel further comprising a pair of infill cover panels, the infill cover panels being slidably coupled to the cover panel and slidably movable between open and closed conditions, wherein when the apparatus is in the stowed condition the infill cover panels each assume an open position and when the apparatus is in the deployed condition the infill cover panels each assume a closed position, in the closed position the infill cover panels being arranged to close the cover panel apertures to a greater extent than in the open position.

Embodiments of the present invention have the advantage that the active wing apparatus may be made relatively compact when in the stowed condition, whilst the wing assembly is able to provide a relatively large surface area to generate a desired aerodynamic effect when the apparatus is in the deployed condition. In some embodiments the presence of the cover panel and infill cover panels reduces aerodynamic drag associated with the apparatus. In some embodiments the presence of the cover panel and infill cover panels enhances an aesthetic appearance of the apparatus.

Optionally, the infill cover panels are coupled to the respective lifting arm at a location between the first ends, wherein when the apparatus transitions from the stowed to the deployed conditions, the lifting arms cause lifting of the infill cover panels which in turn causes sliding of the infill panels relative to the cover panel and lifting of the cover panel as the wing assembly lifts.

Optionally, when the apparatus is in the stowed condition the infill cover panels assume positions of closest approach to one another and when the apparatus is in the deployed condition the infill cover panels assume positions of furthest travel from one another Optionally, the second ends of the lifting arms are coupled to the wing assembly at respective lifting arm wing assembly pivot points that are arranged to move along a second, transverse, direction substantially orthogonal to the first direction when the apparatus transitions from the stowed to the deployed conditions.

Optionally, the respective lifting arm wing assembly pivot points are arranged to move along the second, transverse, direction in opposite directions to one another when the apparatus transitions from the stowed to the deployed conditions.

Optionally, the respective lifting arm wing assembly pivot points are arranged to move along the second, transverse, direction laterally away from one another when the apparatus transitions from the stowed to the deployed conditions.

Optionally, the first end of the lifting arm rotates about a point that is provided at a substantially fixed location relative to the body of the vehicle when the apparatus transitions from the stowed to the deployed conditions.

Optionally, the wing assembly is configured to reversibly expand along a second direction transverse to the first direction from a compact condition to an expanded condition when the wing apparatus deploys from the stowed condition to the deployed condition.

Thus it is to be understood that a wingspan of the wing assembly increases when the apparatus deploys from the stowed condition to the deployed condition.

Optionally, the wing assembly is configured to reversibly expand telescopically along the second direction transverse to the first direction.

Optionally, the wing assembly comprises a primary wing portion and a secondary wing portion, the wing assembly being configured to reversibly expand by movement of the secondary wing portion laterally outwardly the respect to the primary wing portion.

Optionally, the secondary wing portion is slidably received within the primary wing portion, the wing assembly being configured to reversibly expand telescopically by movement of the secondary wing portion outwardly from within the primary wing portion.

Optionally, the secondary wing portion comprises first and second secondary wing components configured to move outwardly from respective laterally opposite ends of the primary wing portion when the apparatus transitions from the stowed to the deployed conditions to cause the wing assembly to reversibly expand.

Optionally, the apparatus comprises a drive portion configured to cause the wing assembly to reversibly deploy from the stowed condition to the deployed condition.

Optionally, the drive portion comprises a single actuator.

Optionally, the single actuator comprises a single electric motor.

The feature that movement of the first and second secondary wing portions may be coordinated or synchronised automatically by a single actuator has the advantage that a complexity and potentially a cost of the apparatus may be reduced by reducing the number of components required. The single actuator may be the only actuator for causing the wing assembly reversibly to deploy.

Other types of actuator may be useful in some embodiments such as a piezoelectric actuator, for example a piezoelectric linear actuator.

Optionally, the drive portion is configured to cause the wing assembly to reversibly deploy by causing the lifting means to cause lifting of the wing assembly.

Optionally, the drive portion is configured to drive at least one threaded shaft comprised by the wing assembly to cause the wing assembly to reversibly deploy and expand.

It is to be understood that in some embodiments a single threaded shaft may drive both the first and second secondary wing components. Respective portions of the threaded shaft that are coupled to the first and second secondary wing components may have threads of opposite handedness. Thus the portion of the threaded shaft to which the first secondary wing portion is coupled may be one of a left-hand or right-hand thread, whilst the portion of the threaded shaft to which the second secondary wing portion is coupled may be the other of a left-hand or right-hand thread.

In some alternative embodiments, two threaded shafts may be provided, optionally of opposite handedness, one to drive the first secondary wing portion and one to drive the second secondary wing portion. The two shafts may be driven by a single drive portion, optionally a single actuator, optionally a single electric motor. For example the threaded shafts may be coupled to opposite ends of a drive shaft of the electric motor.

It is to be understood that, in some embodiments, rotation of the at least one threaded shaft may cause the apparatus to transition part-way between the stowed and deployed conditions, with initial and/or final movement from one condition to the other being effected by one or more other means. In some embodiments, initial movement of the apparatus from the stowed condition and/or the deployed condition may be effected by means other than rotation of the at least one threaded shaft in addition to or instead of rotation of the at least one threaded shaft.

Optionally, rotation of the at least one threaded shaft causes the lifting arm wing assembly pivot points to move along the second, transverse, direction when the apparatus transitions from the stowed to the deployed conditions.

Optionally, the apparatus further comprises anchor means configured reversibly to couple the apparatus to a structural member of the vehicle when the apparatus transitions from the stowed to the deployed conditions.

Optionally, the anchor means is coupled to the lifting means, wherein the lifting means causes the anchor means reversibly to couple the apparatus to the structural member of the vehicle when the apparatus transitions from the stowed to the deployed conditions.

Optionally, the anchor means comprises at least one shooting bolt configured to assume a deployed position when the apparatus is in the deployed condition and a stowed position when the apparatus in the stowed condition, wherein with the apparatus in the deployed condition the shooting bolt locks the apparatus to the structural member of the vehicle and with the apparatus in the stowed condition the apparatus is released from the structural member.

Optionally, at least one said at least one shooting bolt is coupled to at least one lifting arm, the apparatus being arranged wherein movement of the at least one lifting arm towards the deployed condition causes at least one shooting bolt to move towards the deployed position.

In some embodiments, as the at least one lifting arm is raised to the deployed position the at least one shooting bolt moves towards the deployed position to lock the apparatus to the structural member. At least a portion of the at least one shooting bolt may be arranged to pass through an aperture formed in the structural member so as to lock the apparatus to the structural member. The at least one shooting bolt may be arranged to move axially in a substantially horizontal plane when it moves from the deployed position to lock the apparatus to the structural member.

Optionally, each said at least one shooting bolt is coupled to at least one lifting arm by means of a bar linkage to form a slider crank mechanism, wherein rotation of the at least one lifting arm causes the bar linkage to cause axial translation of at least one shooting bolt from the stowed condition to the deployed condition.

Optionally, the apparatus further comprises pitch adjustment means for adjusting a pitch angle of the wing assembly in real time whilst the vehicle is travelling.

Optionally, the pitch adjustment means is configured to cause rotation of the wing assembly about an axis parallel to the second direction.

Optionally, the pitch adjustment means comprises an actuator comprising an electric motor.

Optionally, the controller is configured to cause the apparatus to assume the stowed condition or the deployed condition in dependence at least in part on at least one input signal.

Optionally, the controller is configured to receive a vehicle speed signal indicative of vehicle speed over ground, the controller being configured to cause the apparatus to assume the deployed condition if the apparatus is in the stowed condition and vehicle speed exceeds a first deployment speed value, and to assume the stowed condition if the apparatus is in the deployed condition and vehicle speed falls below a first retraction speed value.

Optionally, the first deployment speed value is greater than the first retraction speed value.

Optionally, the controller is configured to cause adjustment of the pitch angle of the wing assembly by means of the pitch adjustment means.

In a further aspect of the invention for which protection is sought there is provided a vehicle comprising apparatus according to another aspect.

The vehicle may further comprise a controller according to another aspect.

Optionally, the apparatus is coupled to a boot lid of the motor vehicle and the anchor means is configured releasably to couple the apparatus to a structural member of the vehicle, wherein the structural member forms part of a body of the vehicle other than the boot lid.

Optionally, the structural member is a portion of the body of the vehicle that defines at least in part an aperture that is opened and closed by the boot lid, and with respect to which the boot lid moves when the boot lid is opened or closed.

In an aspect of the invention for which protection is sought there is provided a method of increasing traction between a vehicle and ground, the method comprising causing an active wing apparatus of the motor vehicle to reversibly deploy a wing assembly thereof upwardly in a first direction from a stowed condition to a deployed condition, the method comprising causing lifting means to lift the wing assembly when the apparatus is reversibly deployed in the first direction from the stowed condition to the deployed condition, wherein causing the lifting means to lift the wing assembly comprises causing at least two lifting arms, each having respective first and second ends, the second end of each lifting arm being pivotably coupled to the wing assembly, the first end of each lifting arm being pivotably coupled to an lifting arm anchor portion coupled to a portion of a body of the vehicle, to rotate about the first and second ends causes lifting of the wing assembly, the method further comprising causing a cover panel provided below the wing assembly to be raised and lowered between stowed and deployed conditions when the apparatus transitions between the stowed and deployed conditions, in the deployed condition the cover panel being arranged to at least partially cover a recess formed in a body portion of the vehicle within which at least a portion of the apparatus is provided when the apparatus is in the stowed condition, the lifting arms being configured to protrude through cover panel apertures formed in the cover panel to enable connection of the wing assembly to the portion of the vehicle body, the cover panel further comprising a pair of infill cover panels, the infill cover panels being slidably coupled to the cover panel and slidably movable between open and closed conditions, whereby when the apparatus is in the stowed condition the infill cover panels each assume an open position and when the apparatus is in the deployed condition the infill cover panels each assume a closed position, in the closed position the infill cover panels being arranged to close the cover panel apertures to a greater extent than in the open position.

Optionally, reversibly deploying the wing assembly in a first direction from the stowed condition to the deployed condition comprises causing lifting of the wing assembly from a location within a boot lid of the vehicle.

Optionally, the method comprises causing the wing assembly to reversibly deploy and reversibly expand by means of a single actuator.

Optionally, the method comprises causing the wing assembly to reversibly deploy and reversibly expand by means of a single actuator in the form of an electric motor.

In a further aspect of the invention for which protection is sought there is provided an active wing apparatus for a motor vehicle, the apparatus comprising a wing assembly configured to reversibly deploy upwardly in a first direction from a stowed condition to a deployed condition, the apparatus comprising lifting means for lifting the wing assembly when the apparatus is reversibly deployed in the first direction from the stowed condition to the deployed condition, wherein the lifting means comprises at least two lifting arms, each having respective first and second ends, the second end of each lifting arm being pivotably coupled to the wing assembly, the first end of each lifting arm being pivotably coupled to a lifting arm anchor portion coupled to a portion of a body of the vehicle, wherein rotation of the lifting arms about the first and second ends causes lifting of the wing assembly.

In an embodiment the apparatus further comprises a cover panel provided below the wing assembly, the cover panel being arranged to be raised and lowered between stowed and deployed conditions when the apparatus transitions between the stowed and deployed conditions, in the deployed condition the cover panel being arranged to at least partially cover a recess formed in a body portion of the vehicle within which at least a portion of the apparatus is provided when the apparatus is in the stowed condition, the lifting arms being configured to protrude through cover panel apertures formed in the cover panel to enable connection of the wing assembly to the portion of the vehicle body.

Optionally the cover panel further comprises a pair of infill cover panels, the panels being slidably coupled to the cover panel and slidably movable between open and closed conditions, wherein when the apparatus is in the stowed condition the infill cover panels each assume an open position in which the infill cover panels are at positions of closest approach to one another and when the apparatus is in the deployed condition the infill cover panels assume a closed position in which the infill cover panels are at positions of furthest travel from one another, in the closed position the infill cover panels being arranged to close the cover panel apertures to a greater extent than in the open position, the infill cover panels being coupled to the respective lifting arm at a location between the first ends, wherein when the apparatus transitions from the stowed to the deployed conditions, the lifting arms cause lifting of the infill cover panels which in turn causes sliding of the infill panels relative to the cover panel and lifting of the cover panel as the wing assembly lifts.

Embodiments of the present invention have the advantage that the active wing apparatus may be made relatively compact when in the stowed condition, whilst the wing assembly is able to provide a relatively large surface area to generate a desired aerodynamic effect when the apparatus is in the deployed condition.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

The present invention will now be described, by way of example only, with reference to the accompanying drawings, in which.

DETAILED DESCRIPTION

Figure 1:
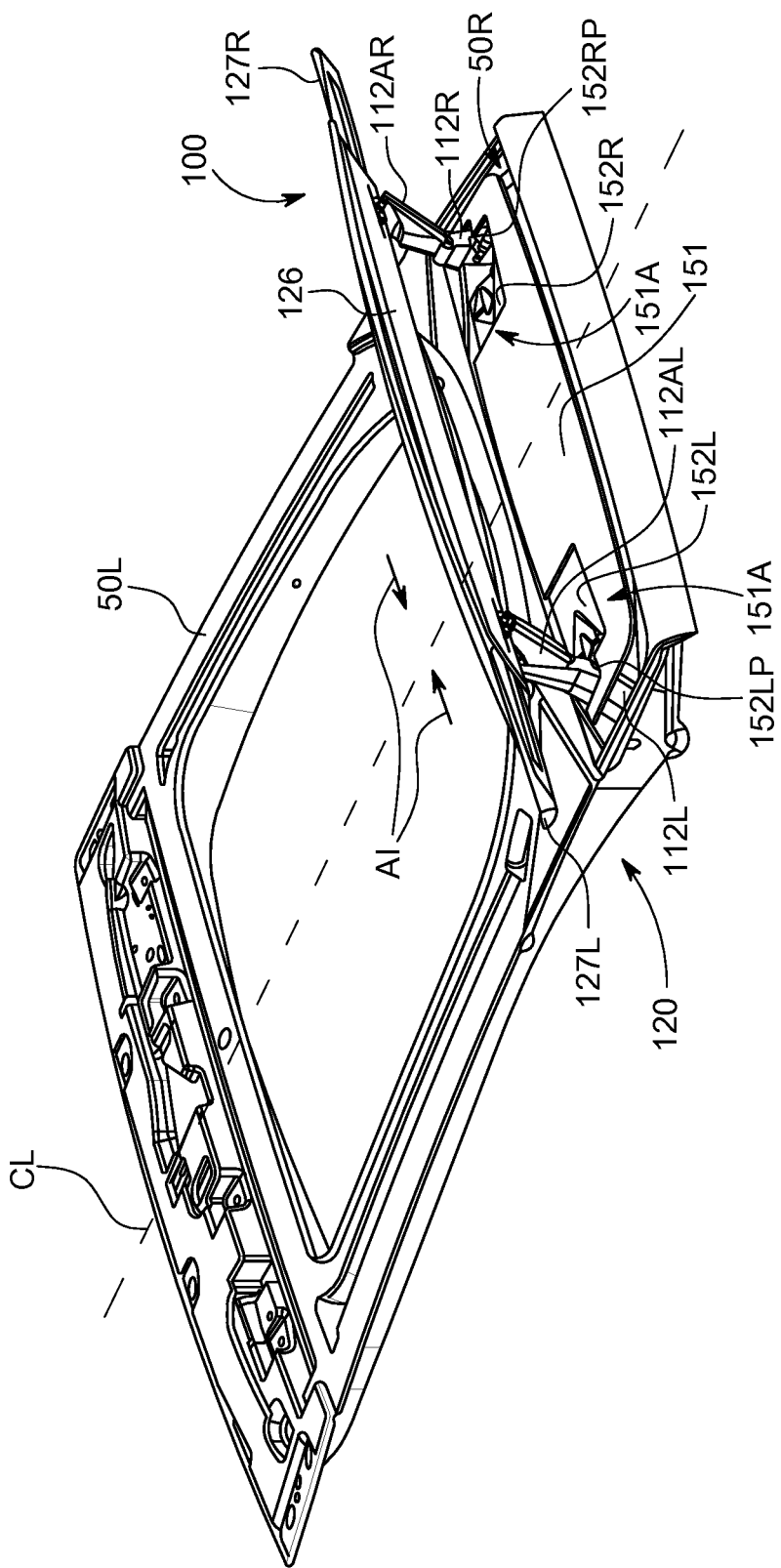
FIG. 1 is a perspective view of a vehicle boot lid having rear wing apparatus according to an embodiment of the invention installed thereon.
Figure 2:
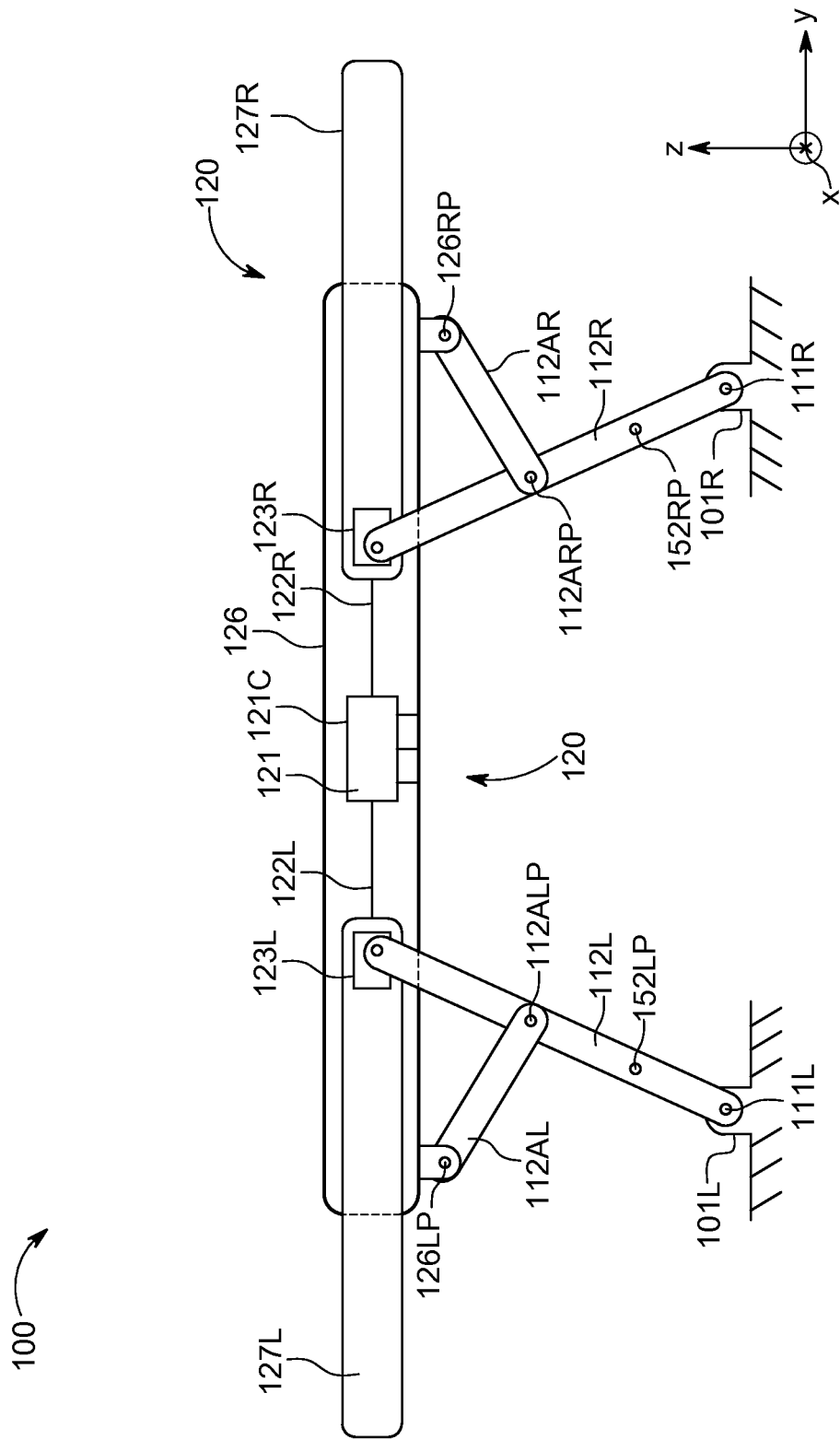
FIG. 2 is a rear view of the rear wing apparatus of FIG. 1 in a semi-deployed condition and mounted to a tray provided in a rear boot lid of a vehicle, as viewed in a forward direction along a longitudinal axis of the body of the motor vehicle body to which the apparatus is mounted.
Figure 3:
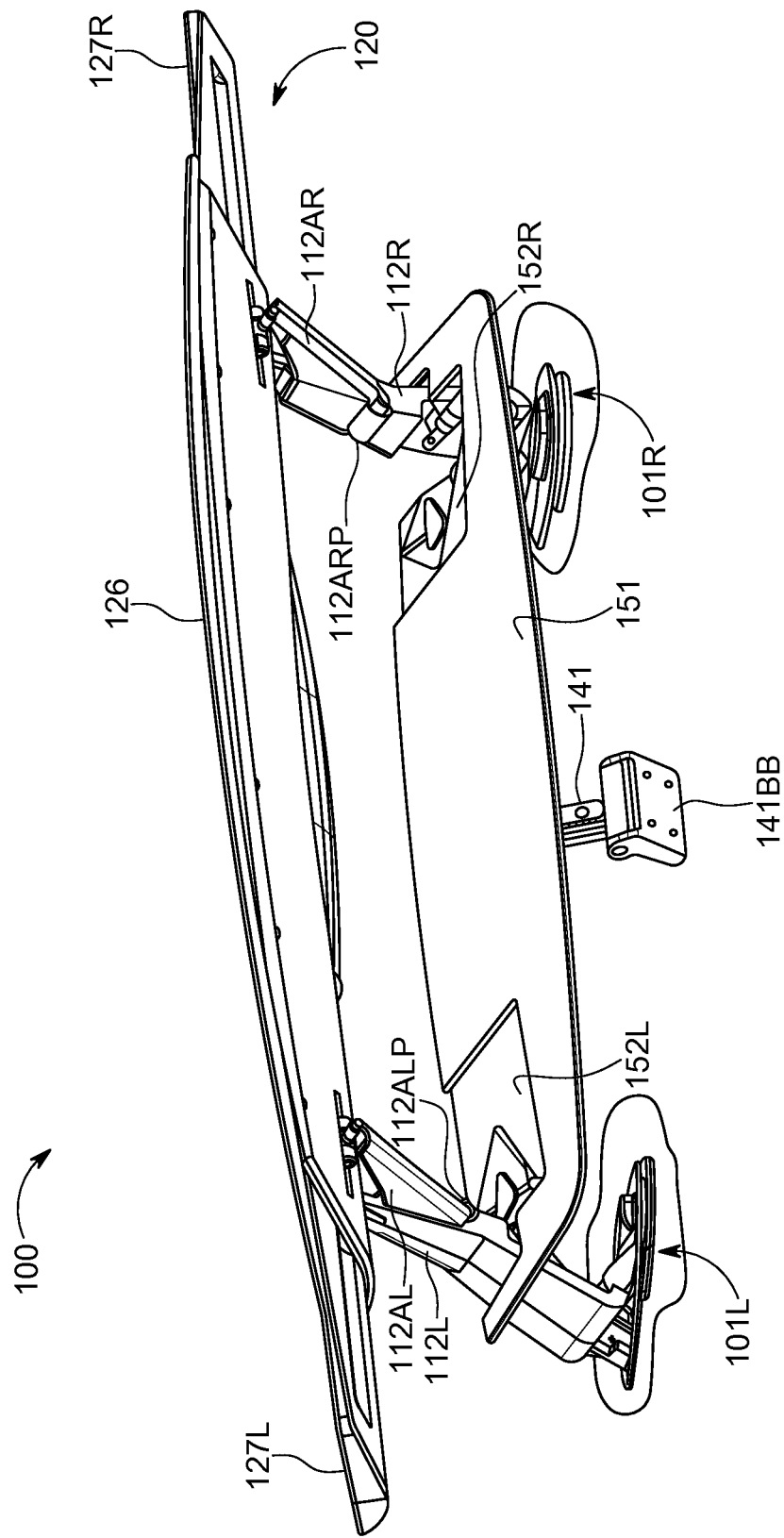
FIG. 3 is a schematic perspective illustration of a rear wing apparatus according to an embodiment of the present invention in a fully deployed condition as viewed from behind the apparatus.
Figure 9:
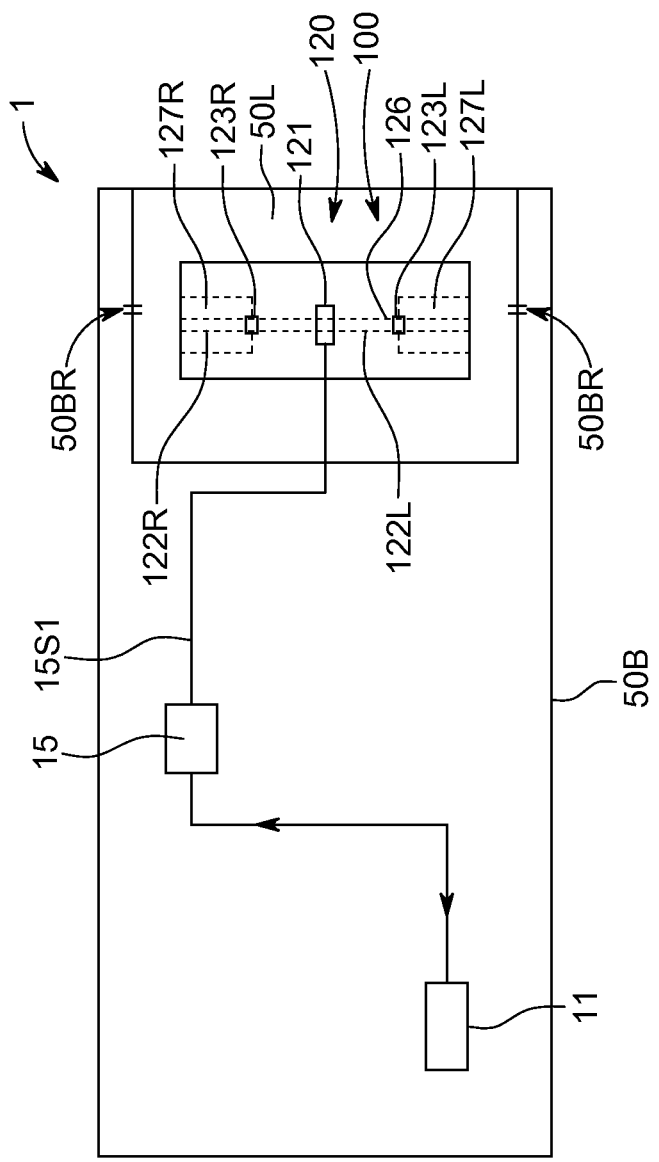
FIG. 9 is a plan view of a vehicle incorporating the rear wing apparatus of FIG. 1 in a boot lid thereof.

FIG. 1 is a perspective view of a portion of a boot lid 50L of a motor vehicle having a rear wing apparatus 100 according to an embodiment of the invention. FIG. 2 is a section view of the rear wing apparatus 100. The boot lid 50L forms part of a body 50B of the vehicle (FIG. 9). An x-axis of the Cartesian coordinate system illustrated is directed into the plane of the page as indicated by the feathered arrow indicated at x. FIG. 3 is a rear perspective view of the apparatus 100 which is arranged to be mounted within the boot (or trunk) lid 50L.

The apparatus 100 has respective left and right mounting portions 101L, 101R arranged to enable the apparatus to be mounted to the lid 50L. The mounting portions 101L, 101R each carry respective lever arms 112L, 112R that support an expandable wing assembly 120 of the apparatus 100.

The pair of lever arms 112L, 112R are each pivotably coupled at a respective pivot 111L, 111R at a first end to the respective mounting portions 101L, 101R so as to enable rotation of the respective lever arm 112L, 112R about respective axes parallel to a longitudinal (x) axis of the vehicle. The lever arms 112L, 112R are each arranged to pivot between a stowed (or retracted) position in which they project inwardly towards a centreline (CL) of the vehicle (FIG. 1), and a deployed position in which they are each substantially vertically oriented. FIG. 1 shows the apparatus 100 with the lever arms 112L, 112R in a semi-deployed position, substantially midway between stowed and deployed positions, with the expandable wing assembly 120 in the process of being raised to a deployed position. In the embodiment shown the lever arms 112L, 112R lie in a substantially horizontal plane when the apparatus 100 is in the stowed condition as shown in FIG. 4(a).

A second end of each lever arm 112L, 112R opposite the first is pivotably coupled to a respective threaded union joint 123L, 123R each of which sits within a primary wing portion 126 of the expandable wing assembly 120. The union joints 123L, 123R each have a threaded bore, the bores of the respective joints 123L, 123R being of opposite thread to one another. In the present embodiment the left-hand union joint 123L carries a left-hand thread and the right-hand union joint 123R carries a right-hand thread.

A pair of threaded bars 122L, 122R are also provided within the primary wing portion 126 and pass through the bores of respective union joints 123L, 123R. A first bar 122L that passes through the left-hand union joint 123L carries a left-hand thread corresponding to that of the left-hand union join 123L and a second bar 122R that passes through the right-hand union joint 123R carries a right-hand thread corresponding to that of the right-hand union join 123R.

The threaded bars 122L, 122R are coupled to a primary drive motor 121 that is substantially coaxial with the bars 122L, 122R. The bars 122L, 122R are coupled to respective left and right spindles of the motor 121 in the arrangement shown and the motor 121 is configured to cause rotation of the bars 122L, 122R relative to a casing 121C of the motor 121. The casing 121C is coupled to the primary wing portion 126 of the wing assembly 120. Accordingly, the motor 121 is able to cause turning of the threaded bar 122 relative to the primary wing portion 126 which in turn causes the union joints 123L, 123R to move either towards one another, i.e. in an inboard direction within the primary wing portion 126, or away from one another, i.e. in an outboard direction. It is to be understood that if in the position shown in FIG. 1 the motor 121 rotates in a direction to cause the union joints 123L, 123R to move in the inboard direction, the primary wing portion 126 will be lowered. Rotation of the motor 121 in the opposite direction causes the primary wing portion 126 to be raised. Arrows AI of FIG. 1 illustrate the inboard direction of travel from respective opposite sides of the centreline CL.

The union joints 123L, 123R are each coupled to an inboard end of a respective secondary wing portion 127L, 127R. The secondary wing portions 127L, 127R are arranged concentrically with respect to the primary wing portion 126 and are configured to extend telescopically from the primary wing portion 126 when the union joints 123L, 123R are moved in an outboard direction. That is, when the union joints 123L, 123R are moved in an outboard direction from the position assumed when the apparatus 100 is in the stowed condition to the position assumed when the apparatus 100 is in the deployed condition (illustrated in FIG. 1 and FIG. 3), the secondary wing portions 127L, 127R move from respective stowed positions in which they sit substantially wholly within the primary wing portion 126 to extended (deployed) positions in which they project from the primary wing portion 126 in a laterally outboard direction, increasing the overall wing span of the wing assembly 120.

It is to be understood that one advantage of the embodiment of FIG. 1 is that the action of a single actuator, the primary drive motor 121, is able to cause both raising of the wing assembly 120 and extension of the wing assembly from a first wing span value (corresponding to the lateral length of the primary wing portion 126) to a second wing span value (corresponding to the lateral length of the primary wing portion 126 and extended portions of the secondary wing portions 127L, 127R). In an example embodiment, the first wing span value is substantially 0.8 m and the second wing span value is substantially 1.2 m, the secondary wing portions 127L, 127R each extended laterally outwardly from the primary wing portion 126 by substantially 0.2 m when the apparatus 100 is in the deployed condition. It is to be understood that other values of first and second wing span value may be useful in some embodiments, and are within the scope of the invention. The actual values may be selected in dependence at least in part on the required performance characteristics and constraints imposed by available package space within the boot lid 50L.

The lever arms 112L, 112R are each provided with a respective revolute side arm 112AL, 112AR. The side arms 112AL, 112AR are pivotably coupled at a first end of each side arm to the respective lever arm 112L, 112R at a side arm lever arm pivot 112ALP, 112ARP. The pivots 112ALP, 112ARP are located between the respective pivots 111L, 111R at the first ends of the lever arms 112L, 112R, and union joints 123L, 123R at the opposite ends of the lever arms 112L, 112R. A second end of each side arm 112AL, 112AR is pivotably coupled to the primary wing portion 126 at a side arm wing pivot 126LP, 126RP that is located rearward of the corresponding union joint 123L, 123R with respect to the wing portion 126. The feature that the side arm wing pivots 126LP, 126RP are located rearward of the respective union joints 123L, 123R enhances the stiffness of the apparatus Further, the rearward location of the side arm wing pivots 126LP, 126RP may have the consequence that the pitch angle of the primary wing portion 126 at a given moment in time varies as the apparatus 100 moves between the stowed and deployed conditions. It is to be understood that the pitch angle of the primary wing portion 126 at a given position, from the stowed to the deployed conditions, will depend at least in part on the length of the side arms 112AL, 112AR. With respect to the arrangement shown in FIG. 3, in which the apparatus is in the fully deployed condition, it may be understood that lengthening the side arms 112AL, 112AR will result in a steeper pitch down attitude, whilst shortening the side arms 112AL, 112AR will result in a shallower pitch down attitude. Appropriate selection of the length of the side arms 112AL, 112AR is therefore important in determining the wing pitch angle when in the fully deployed condition.

The manner in which switching of the apparatus 100 between the stowed and deployed conditions is effected is described in more detail below.

In the present embodiment, an automatic shooting bolt arrangement is provided for locking the rear wing apparatus 100 to a portion of the vehicle body structure 50B other than the boot lid 50L when the apparatus 100 assumes the deployed condition. It is to be understood that the aerodynamic downforce generated by the wing assembly 120 may be substantial when the vehicle is travelling at speed. Accordingly, the boot lid 50L and components by means of which the lid 50L is attached to the remainder of the vehicle body 50B may be subject to substantial downward force. The downward force can cause accelerated degradation of these components, which are required to perform important primary functions such as hinging of the boot lid (in the case of hinges) or secure closure of the boot lid 50L in the case of a lock. Accordingly, the present applicant has conceived the feature of anchoring or locking the rear wing apparatus 100 to the remainder of the body 50B of the vehicle when the wing assembly 120 assumes the deployed condition so that forces on the wing assembly 120 are transmitted at least in part directly to the remainder of the vehicle body 50B from the apparatus 100 and not entirely via hinges and/or a lock.

Figure 11:
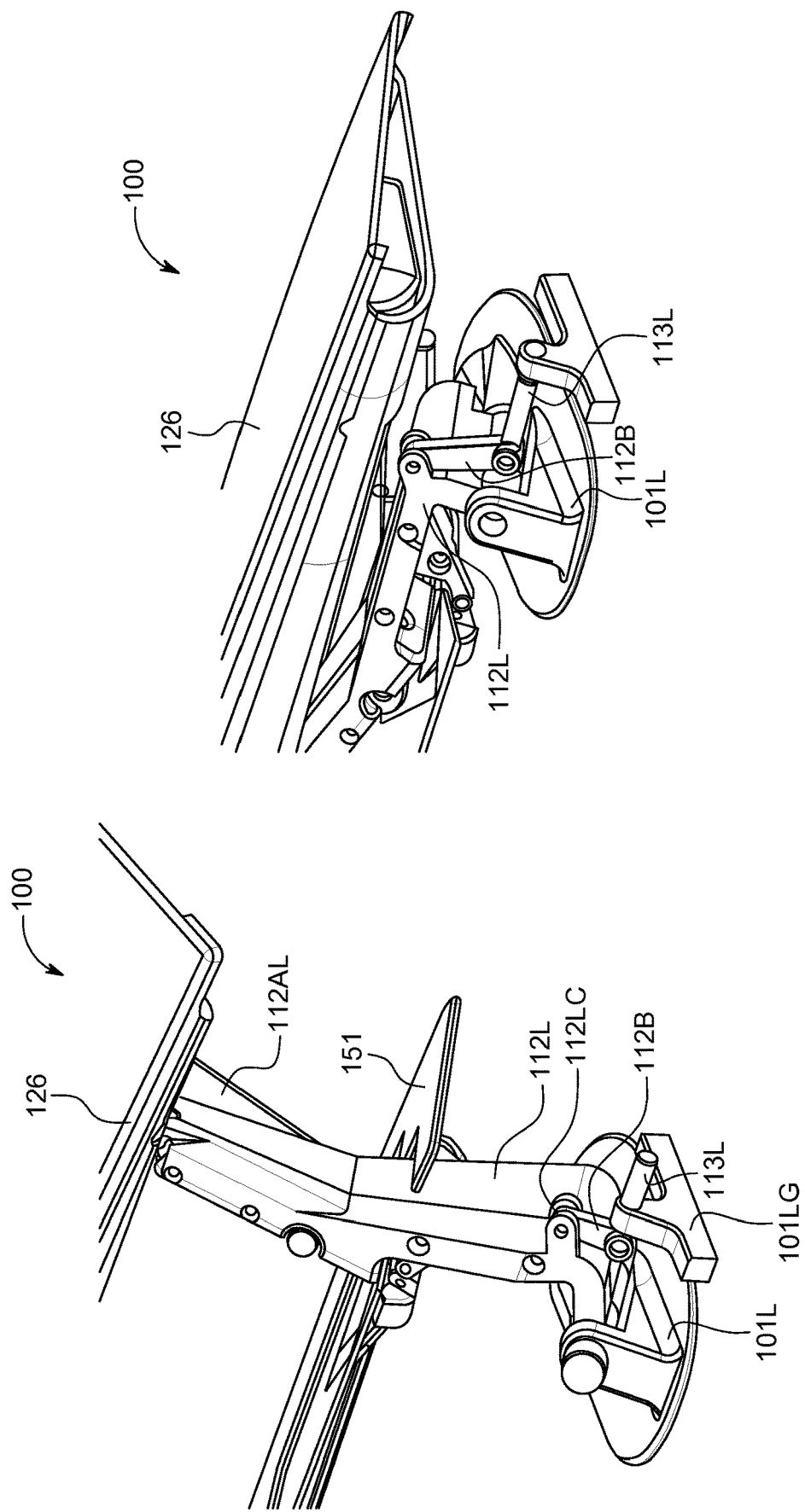
FIG. 11 is a perspective view from a front of the rear wing apparatus of FIG. 1 showing a left-hand portion of the apparatus including detail of a shooting bolt arrangement.

A left-hand portion of the apparatus 100 is illustrated in FIG. 11, showing the shooting bolt arrangement. Whilst the operation of the shooting bolt arrangement is described with respect to left hand lever arm 112L only, it is to be understood that the right hand lever arm 112R is coupled in a similar manner to a corresponding shooting bolt on the right hand side of the apparatus 100.

The first end of the lever arms 112L carries a cam-like portion 112LC that is coupled to a first end of a bar linkage 112B that is in turn coupled at a second end to a shooting bolt 113L. As can be seen in FIG. 1, rotation of the lever arm 112L causes movement of the first end of the bar linkage 112B in an outboard direction when the lever arm 112L is raised. This in turn causes the shooting bolt 113L to slide laterally outboard within a guide aperture formed in an upright guide member 101LG. The shooting bolt 113L slides through the upright guide member 101LG as the lever arm 112L rotates to the upright, deployed condition so that the bolt 113L projects laterally outboard from the tray 50T of the boot lid 50L.

With the boot lid 50L in the closed position as shown in FIG. 1, the shooting bolts 113L, 113R slide through respective apertures into recesses 50BR formed in the portion of the vehicle body 50B adjacent the boot lid 50L. Accordingly, as noted above, aerodynamic forces on the rear wing apparatus 100 in a downward, upward, forward or rear direction may be transferred substantially directly to this portion of the vehicle body structure 50B, rather than substantially entirely via the boot lid 50L. This feature has the effect of reducing adverse stress loading on hinges and a lock associated with the boot lid 50L, reducing a risk of premature wear and premature failure of one or more of these components. The feature may also increase a rigidity with which the apparatus 100 is supported on the vehicle, reducing relative movement between the apparatus 100 and remainder of the vehicle body 50B. This may in turn enhance one or more handling characteristics of the vehicle.

It is to be understood that a further advantage of the embodiment of FIG. 1 is that the action of a single actuator, the primary drive motor 121, is able to cause raising of the wing assembly 120, extension of the wing assembly 120 from the first wing span value to the second wing span value and, in addition, actuation of the shooting bolts 113L to cause locking of the rear wing apparatus 100 to a portion of the vehicle body structure 50B (FIG. 9) other than the boot lid 50L, when the apparatus 100 assumes the deployed condition. The portion of the vehicle body structure 50B to which the shooting bolts 113L cause locking of the rear wing apparatus 100 is a portion of the body with respect to which the boot lid 50L is moveable in order to be placed in an open condition. In vehicles according to embodiments of the present invention that have a chassis, the chassis forms part of the body with respect to which the boot lid 50L moves when being opened or closed.

In some embodiments, the rear wing apparatus 100 is also configured to allow a pitch angle of the wing assembly 120 to be adjusted whilst the wing assembly 120 is in the deployed position. In some embodiments, a length of the revolute side arms 112AL, 112AR may be adjusted in order to adjust the pitch angle. In some embodiments, the rotational positions of the lever arms 112L, 112R is adjusted in order to adjust the pitch angle, thereby slightly modifying the height of the wing assembly 120 above the boot lid 50L.

As shown in FIG. 1 and FIG. 3, the apparatus 100 is further provided with a recess cover 151 that is arranged to cover a recess 50R that is provided in the boot lid 50L that accommodates the apparatus 100 when in the stowed condition. The recess cover 151 has a pair of apertures 151A provided therein through which at least a portion of the lever arms 112L, 112R and revolute side arms 112AL, 112AR may project. When in the stowed condition, the recess cover 151, including the apertures 151A formed therein, is covered by the wing assembly. When in the deployed condition, a portion of each of the apertures 151A is exposed.

Figure 4B:
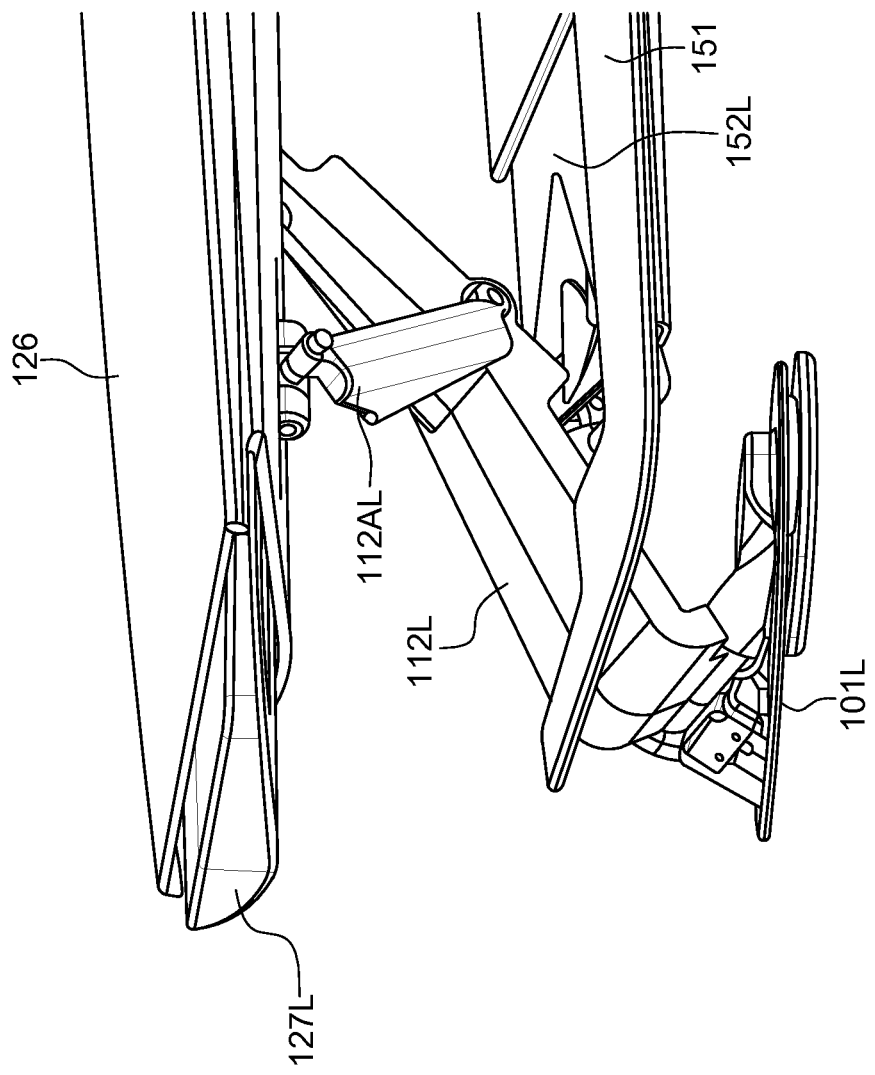
FIG. 4 shows (a) a perspective view of a right-hand portion of the rear wing apparatus of FIG. 1 in a fully stowed or retracted condition as viewed from the front of the apparatus and a rear perspective view of a left-hand portion of the rear wing apparatus of FIG. 1 (b) mid-way between the stowed and deployed conditions and (c) in the fully deployed condition.
Figure 4C:
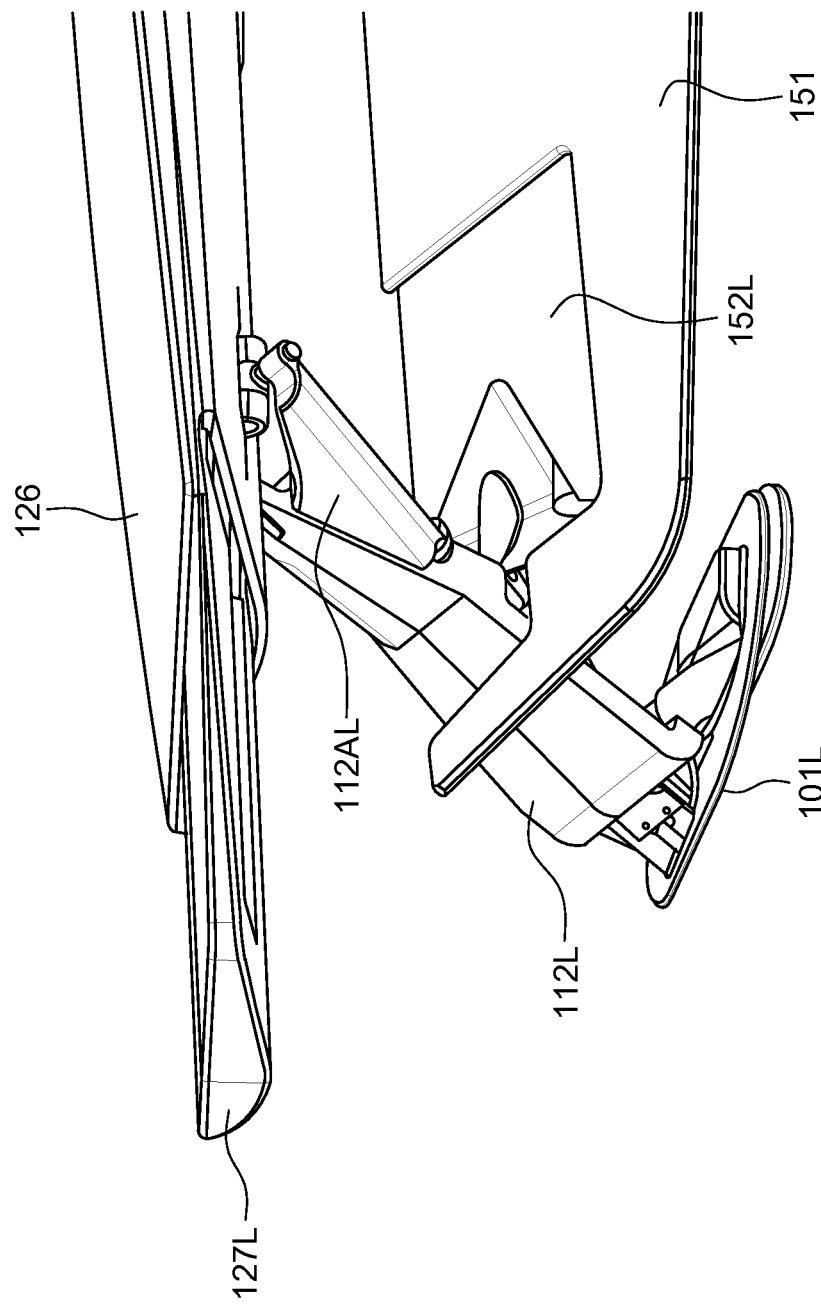

The presence of the apertures can result in disturbance of air flow over the apparatus 100 and may result in moisture ingress in the presence of precipitation. Accordingly, in the present embodiment, respective left and right infill covers 152L, 152R are provided. The infill covers 152L, 152R are arranged to be slidable in tracks 151T provided on an underside of the recess cover 151. FIG. 4(a) is a close up view of a right hand portion of the apparatus 100 as viewed from in front of the apparatus 100 with the apparatus 100 in the stowed condition. The right hand infill cover 152R may be seen, slidable in track 151T formed in the underside of the recess cover 151. FIG. 4(b) is a close up view of a left hand portion of the apparatus 100 as viewed from behind the apparatus 100 with the apparatus in a condition substantially midway between the stowed and deployed conditions. FIG. 4(c) is a similar close up view of the left hand portion of the apparatus 100 viewed from behind with the apparatus in the substantially fully deployed condition.

Figure 5:
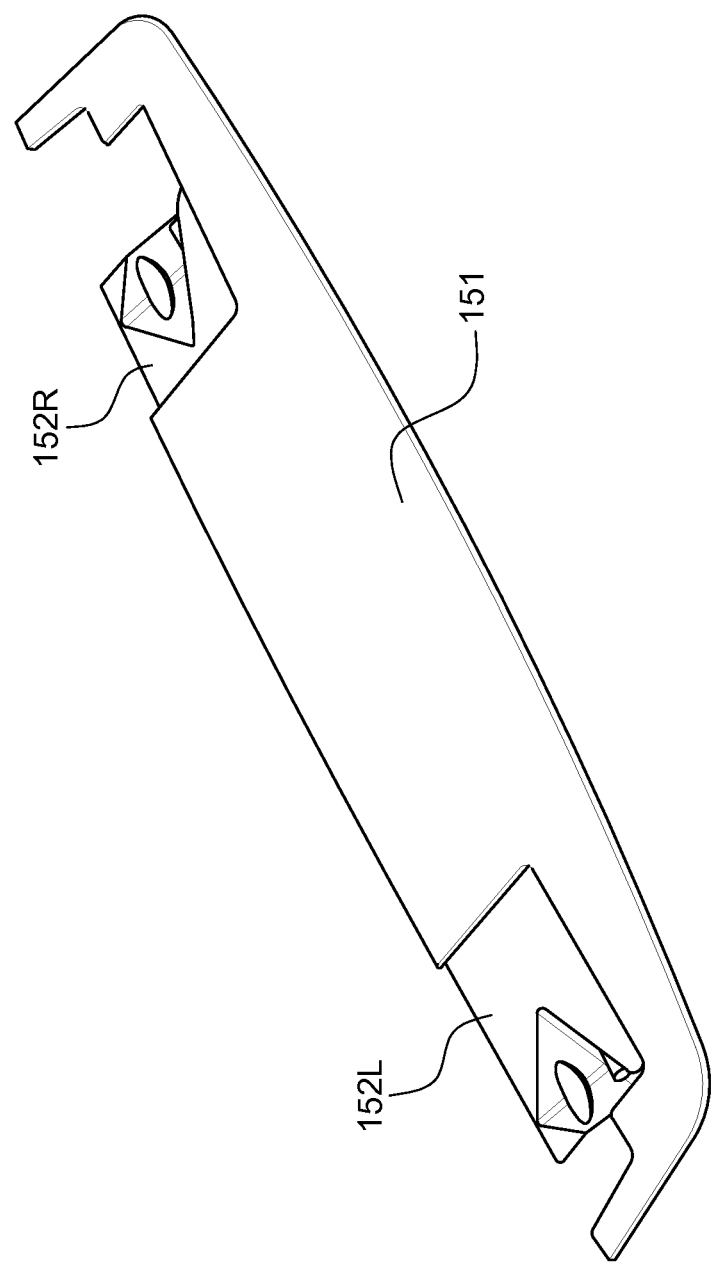
FIG. 5 is a perspective view from above of an expandable wing assembly portion of the apparatus of FIG. 1.

FIG. 5 shows the recess cover 151 with the left infill cover 152L in the 'closed' position assumed when the apparatus 100 is in the deployed condition, and the right infill cover 152R in the 'open' position, assumed when the apparatus 100 is in the stowed condition, to aid comparison.

Figure 6:
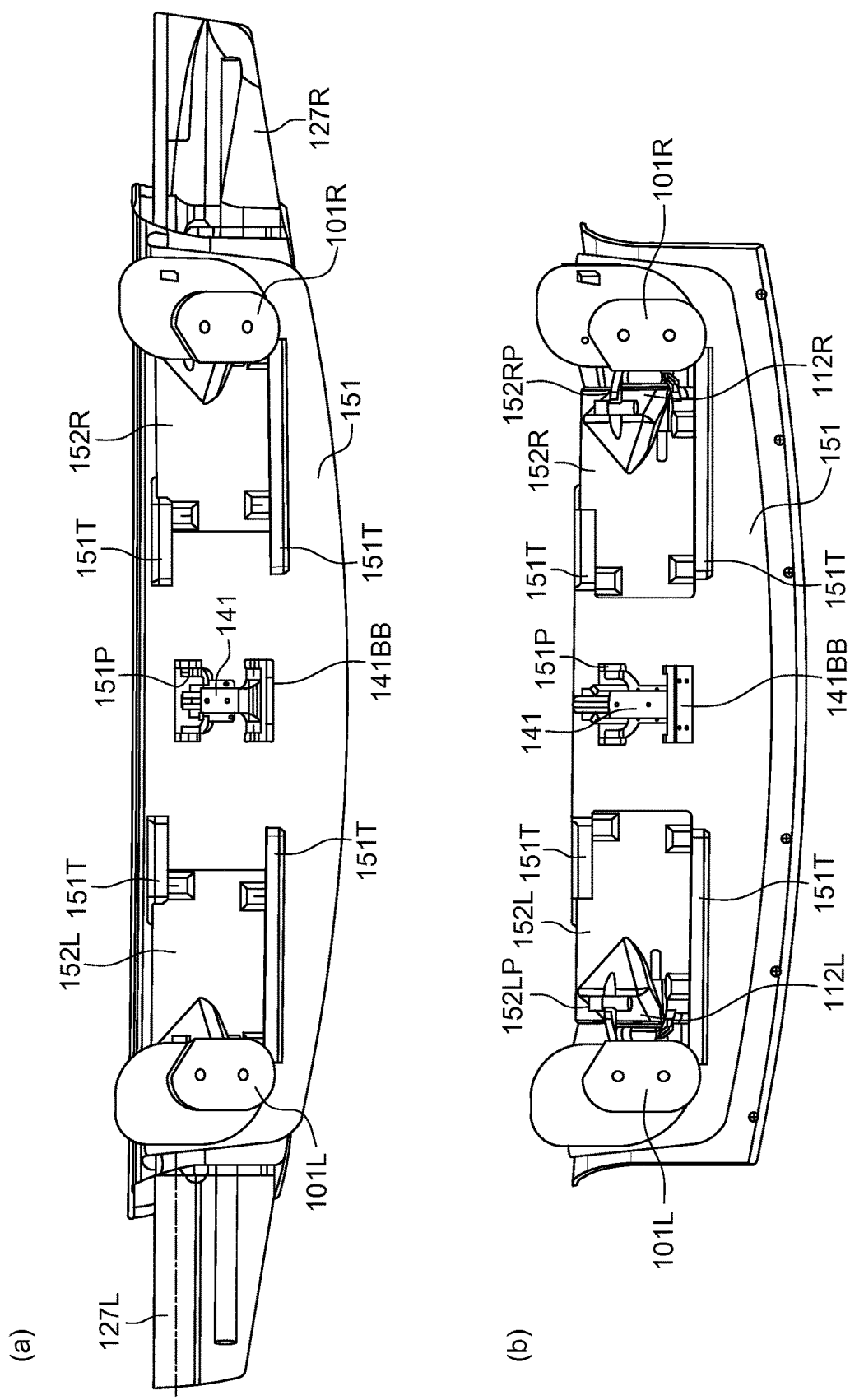
FIG. 6 is a view of the apparatus of FIG. 1 from below I (a) the deployed and (b) the stowed conditions.

FIG. 6 shows an underside of the apparatus 100 in (a) the deployed condition and (b) the stowed condition.

In order to accomplish sliding of the infill covers 152L, 152R between the stowed and deployed conditions, edges of the infill covers 152L, 152R closest to the lever arms 112L, 112R are pivotably coupled to the lever arms 112L, 112R at respective infill cover pivot locations 152LP, 152RP of the lever arms 112L, 112R so that as the lever arms 112L, 112R rotate from the stowed to the deployed position, the infill covers 152L, 152R are drawn along the tracks 151T from the stowed to the deployed condition.

It is to be understood that the infill cover pivot locations 152LP, 152RP are at locations of the lever arms 112L, 112R displaced from the pivots 111L, 111R at the first ends of the lever arms 112L, 112R. Consequently, when the lever arms 112L, 112R rotate from the stowed to the deployed positions as the apparatus 100 transitions from the stowed to the deployed conditions, the recess cover 151 together with the infill covers 152L, 152R is caused to rise. The infill cover pivot locations 152LP, 152RP are selected such that, with the apparatus 100 in the deployed condition, the recess cover 151 is substantially flush with an outer "A" surface of the boot lid 50L.

In FIG. 1 and FIG. 3 the left infill cover 152L is shown in the location assumed by the left infill cover 152L when the apparatus 100 is in the deployed condition. The right infill cover 152R, however, is shown in the position assumed when the apparatus 100 is in the stowed condition, i.e. the right infill cover 152R is shown disconnected from its infill cover pivot location 152RP enabling the infill cover pivot location 152RP to be seen.

Figure 7:
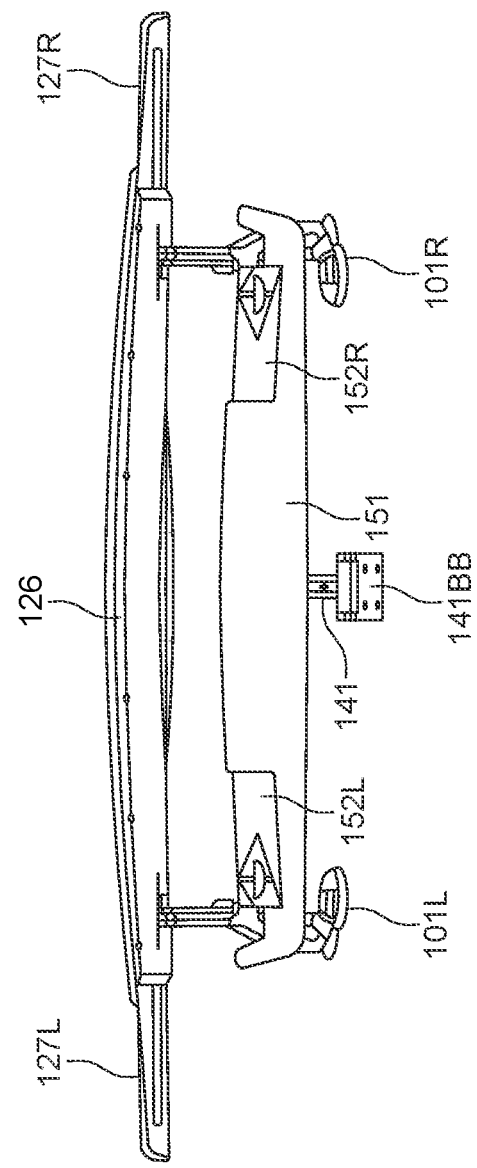
FIG. 7 is a rear view of the rear wing apparatus of the embodiment of FIG. 1 with the apparatus in the deployed condition.

FIG. 7 is a front view of the wing apparatus 100 in the deployed ('raised' or 'extended') condition.

Figure 8:
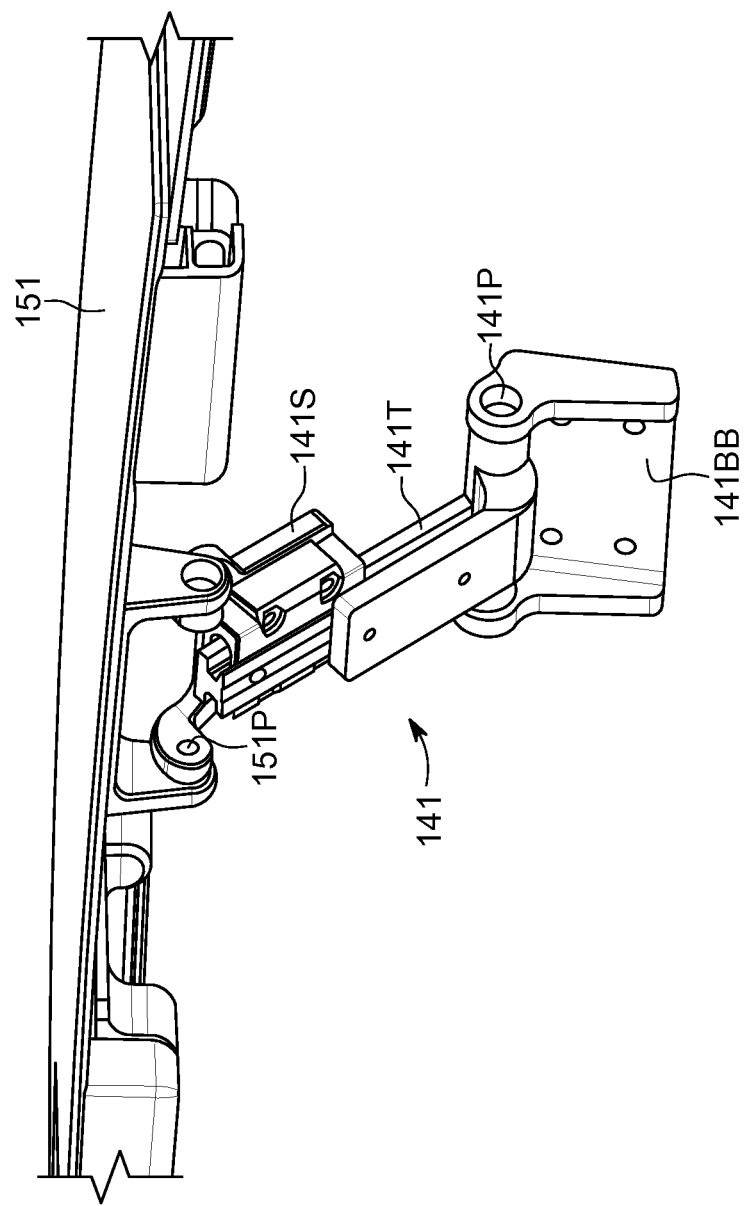
FIG. 8 is a perspective view showing a recess cover and recess cover support arm of the rear wing apparatus of FIG. 1.

The recess cover 151 is provided with a support arm 141 as shown in FIG. 3 and FIG. 8. The purpose of the support arm is to enhance a stiffness of the wing assembly 120, reducing the amount of vibration and deflection or bending thereof in use. The support arm has a track portion in the form of an elongate track member 141T having a substantially "I" shaped cross-section and a slide member 141S that is coupled to the track member 141T and arranged to slide therealong. The slide member 141S is pivotably coupled to an underside of the recess cover 151 at an upper support arm pivot 151P whilst one end of the track member 141T is coupled to a base anchor member 141BB at a lower support arm pivot 141P. The base anchor member 141BB is arranged to be coupled to the boot lid 50L. When the wing apparatus 100 transitions from the stowed to the deployed conditions (and vice versa) the slide member 141S is caused to slide along the track member 141T, such that the distance between the upper support arm pivot 151P and lower support arm pivot 141P may be varied.

In the present embodiment the support arm 141 is a passively extendable member, the electric motor 121 within the wing assembly 120 providing the driving force for raising and lowering the wing assembly 120 and changing the length of the support arm 141. In some alternative embodiments, an additional actuator may be provided for extending and retracting the support arm 141 in order to reduce the loading on the wing assembly motor 121.

The rear wing apparatus 100 is provided in the body 50B of a vehicle 1 in combination with a controller 15 as illustrated schematically in FIG. 9. FIG. 9 also shows the boot lid 50L (a portion of which is also shown in FIG. 1) to which the apparatus 100 is mounted.

The controller 15 is configured to cause the primary drive motor 121 of the apparatus 100 to be operated to cause the apparatus 100 to switch between the stowed (retracted) and deployed conditions, via control line 15S1.

In the present embodiment, the controller 15 is configured to communicate with a brake controller 11 of the vehicle 1 and receives from the brake controller 11 real-time signals indicative of the speed of the vehicle 1 over ground. Other arrangements may be useful in some alternative embodiments. For example the controller 15 may communicate with a controller other than a brake controller in order to receive vehicle speed information. In some embodiments the controller 15 may also receive signals indicative of the amount of brake pressure being applied in a hydraulic braking system of the vehicle 1 in order to cause braking, and/or the amount of lateral acceleration experienced by the vehicle 1, at a given moment in time.

The controller 15 determines whether the apparatus 100 should be placed in the stowed or deployed condition in dependence on the signal indicative of vehicle speed. If the vehicle speed exceeds a first deployment speed value for more than a predetermined time period, the controller 15 determines that the apparatus 100 should be caused to assume the deployed condition. The controller 15 the causes the apparatus 100 to assume the deployed condition by activating the primary drive motor 121. In the present embodiment the first deployment speed value is substantially 60 kph and the predetermined time period is substantially 5 s. Other speed values and other time periods may be useful in some embodiments.

If whilst the apparatus 100 is in the deployed condition the vehicle speed falls below a first retraction speed value for more than a predetermined time period, the controller 15 determines that the apparatus should be placed in the stowed condition. Accordingly, the controller 15 causes the apparatus 100 to assume the stowed condition by again activating the primary drive motor 121, but in the reverse direction. In the present embodiment the first retraction speed value is substantially 40 kph and the predetermined time period is substantially 5 s. Other speed values and other time periods may be useful in some embodiments.

In the present embodiment, when the wing apparatus 100 is in the deployed condition, the wing assembly 120 assumes a baseline pitch angle that is substantially 10 degrees below a horizontal reference plane, being a plane that is fixed with respect to the vehicle body 50B.

In some embodiments, having variable pitch control, when the controller cause the apparatus 100 to assume the deployed condition, the controller 15 initially causes the wing assembly 120 to assume the baseline pitch angle (10 degrees below a horizontal reference plane.

Whilst the apparatus 100 is in the deployed condition, the controller 15 may monitor the signal indicative of brake pressure (brake pressure signal') and the signal indicative of lateral acceleration (lateral acceleration signal') in order to determine the required pitch angle of the wing assembly 120.

In some embodiments, the controller 15 causes the pitch angle of the wing assembly 120 to be set to a predetermined value other than the baseline pitch angle in the event that the controller 15 determines that a predetermined force enhancement condition exists.

The controller may determine that a predetermined force enhancement condition exists if any one of the following conditions is met:

(i) the lateral acceleration signal indicates that the amount of lateral acceleration experienced by the vehicle exceeds a first predetermined lateral acceleration value or has exceeded this value within a predetermined lateral acceleration period of the present time; or (ii) the brake pressure signal indicates that the amount of brake pressure exceeds a first predetermined brake pressure value or has exceeded this value within a predetermined brake pressure period of the present time.

In the event that only condition (i) is met, the controller 15 may cause the pitch angle of the wing assembly 120 to be set to a first predetermined cornering pitch angle, by causing actuation of the pitch actuator device 131.

In the event that only condition (ii) is met, the controller 15 may cause the pitch angle of the wing assembly 120 to be set to a first predetermined braking pitch angle.

In the event that both conditions (i) and (ii) are met, the controller 15 may cause the pitch angle of the wing assembly 120 to be set to the higher of the first predetermined cornering pitch angle and the first predetermined braking pitch angle. If one of the two conditions is subsequently not met but the other is, the controller 15 may cause the pitch angle to be set to the value corresponding to the condition that is met, until the condition is no longer met. When neither condition is met the controller 15 may cause the pitch angle of the wing assembly 120 to revert to the baseline pitch angle.

In some embodiments, the first predetermined cornering pitch angle may be substantially 30 degrees below the horizontal plane, the first predetermined lateral acceleration value may be 0.5 g and the predetermined brake pressure period may be substantially 5 s. Other values of predetermined cornering pitch angle, predetermined lateral acceleration value and predetermined brake pressure period may be useful in some embodiments.

In some embodiments the first predetermined braking pitch angle may be substantially 30 degrees, the first predetermined brake pressure value may be substantially 5 bar and the predetermined brake pressure period may be 5 s. Other values of first predetermined braking pitch angle, predetermined brake pressure value and predetermined brake pressure period may be useful in some embodiments.

In some embodiments, in the event that both of conditions (i) and (ii) are met the controller 15 may cause the pitch angle of the wing assembly 120 to be set to a predetermined value that is higher than both the first predetermined cornering pitch angle and the first predetermined braking pitch angle in order to further increase the downward force imposed on the vehicle 1 by the wing assembly 120 whilst the vehicle 1 is braking and cornering.

In some embodiments, the pitch angle to which the wing assembly 120 is set during cornering may be dependent on the lateral acceleration value experienced by the vehicle 1, the amount by which the pitch angle is steepened below the baseline value increasing with increasing lateral acceleration as indicated by the lateral acceleration signal.

Similarly, in some embodiments, the pitch angle to which the wing assembly 120 is set during braking may be dependent on the brake pressure value experienced by the vehicle 1, the amount by which the pitch angle is steepened below the baseline value increasing with increasing brake pressure value as indicated by the brake pressure signal.

In some embodiments, the wing apparatus 100 may be configured to assume the deployed condition when vehicle speed exceeds a predetermined value and, once deployed, remain deployed until the vehicle 1 remains stationary for more than a predetermined time period, or the vehicle is placed in a parked condition. The controller 15 may determine that the vehicle 1 is in a parked condition by one or more of a variety of means, for example by determining that a driver has placed a transmission of the vehicle in a 'park' or similar mode, where the transmission has such a mode, that the driver has switched off an engine of the vehicle, and/or any other suitable means.

Figure 10:
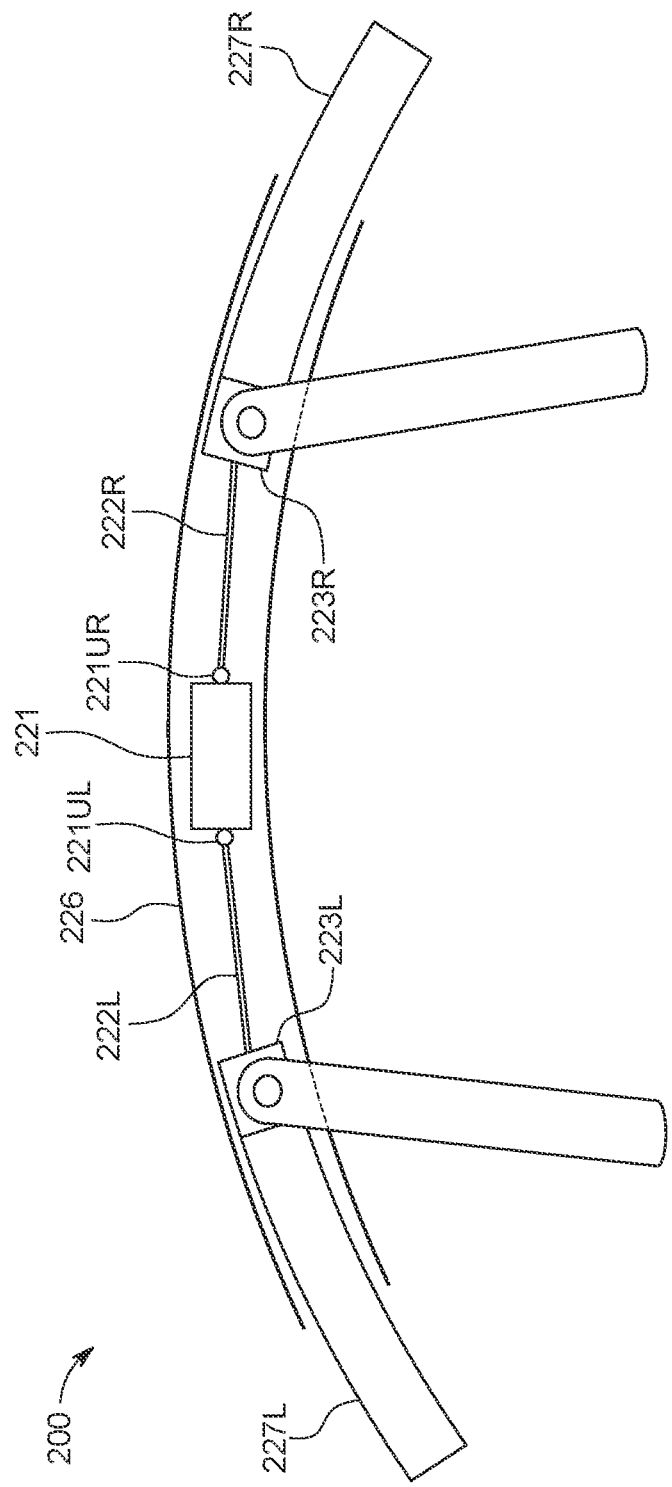
FIG. 10 is a rear view showing a portion of a rear wing apparatus according to a further embodiment of the invention.

In some embodiments, at least a portion of the primary wing portion 126 and secondary wing portions 127L, 127R may be curved. FIG. 10 illustrates a left hand portion of a rear wing apparatus 200 according to a further embodiment of the invention. Like features of the embodiment of FIG. 10 to those of the embodiment of FIGS. 1 to 9 are shown with like reference signs incremented by 100.

The wing apparatus 200 has curved secondary wing portions 227L, 227R that are slidably received within a correspondingly curved primary wing portion 226. Drive motor 221 is coupled to left and right union joints 223L, 223R by means of respective threaded bars 222L, 222R. The threaded bars 222L, 222R are coupled to the drive motor 221 at respective universal joints 221UL, 221UR. The universal joints 221UL, 221UR allow respective threaded bar 222L, 222R to rotate whilst at the same time experience pivoting about an axis substantially parallel to a longitudinal axis of the motor vehicle to which the wing apparatus 200 is attached, as the left secondary wing portions 227L, 227R are moved reversibly between stowed and deployed conditions.

It will be understood that the embodiments described above are given by way of example only and are not intended to limit the invention, the scope of which is defined in the appended claims.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The reader's attention is directed to all papers and documents which are filed concurrently with or previous to this specification in connection with this application and which are open to public inspection with this specification, and the contents of all such papers and documents are incorporated herein by reference.

The invention claimed is:

1. An active wing apparatus for a motor vehicle, the apparatus comprising a wing assembly configured to reversibly deploy upwardly in a first direction from a stowed condition to a deployed condition, the apparatus comprising a lifting mechanism configured to lift the wing assembly when the apparatus is reversibly deployed in the first direction from the stowed condition to the deployed condition, wherein the lifting mechanism comprises at least two lifting arms, each having respective first and second ends, the second end of each lifting arm being pivotably coupled to the wing assembly, the first end of each lifting arm being pivotably coupled to a mounting portion that is substantially fixed with respect to a portion of a body of the vehicle, wherein rotation of the lifting arms about the first and second ends causes lifting of the wing assembly, the apparatus further comprising a cover panel provided below the wing assembly, the cover panel being arranged to be raised and lowered between stowed and deployed conditions when the apparatus transitions between the stowed and deployed conditions, in the deployed condition the cover panel being arranged to at least partially cover a recess formed in a body portion of the vehicle within which at least a portion of the apparatus is provided when the apparatus is in the stowed condition, the lifting arms being configured to protrude through cover panel apertures formed in the cover panel to enable connection of the wing assembly to the portion of the vehicle body, the cover panel further comprising a pair of infill cover panels, the infill cover panels being slidably coupled to the cover panel and slidably movable between open and closed conditions, wherein when the apparatus is in the stowed condition the infill cover panels each assume an open position and when the apparatus is in the deployed condition the infill cover panels each assume a closed position, in the closed position the infill cover panels being arranged to close the cover panel apertures to a greater extent than in the open position.

2. The apparatus according to claim 1, wherein the infill cover panels are coupled to the respective lifting arm at a location between the first ends, wherein when the apparatus transitions from the stowed to the deployed conditions, the lifting arms cause lifting of the infill cover panels which in turn causes sliding of the infill panels relative to the cover panel and lifting of the cover panel as the wing assembly lifts.

3. The apparatus according to claim 1, wherein when the apparatus is in the stowed condition the infill cover panels assume positions of closest approach to one another and when the apparatus is in the deployed condition the infill cover panels assume positions of furthest travel from one another.

4. The apparatus according to claim 1, wherein the second ends of the lifting arms are coupled to the wing assembly at respective lifting arm wing assembly pivot points that are arranged to move along a second, transverse, direction substantially orthogonal to the first direction when the apparatus transitions from the stowed to the deployed conditions.

5. The apparatus according to claim 4, wherein the respective lifting arm wing assembly pivot points are arranged to move along the second, transverse, direction in opposite directions to one another when the apparatus transitions from the stowed to the deployed conditions.

6. The apparatus according to claim 5, wherein the respective lifting arm wing assembly pivot points are arranged to move along the second, transverse, direction laterally away from one another when the apparatus transitions from the stowed to the deployed conditions.

7. The apparatus according to claim 1, configured wherein the first end of the lifting arm rotates about a point that is provided at a substantially fixed location relative to the body of the vehicle when the apparatus transitions from the stowed to the deployed conditions.

8. The apparatus according to claim 1, wherein the wing assembly is configured to reversibly expand along a second direction transverse to the first direction from a compact condition to an expanded condition when the wing apparatus deploys from the stowed condition to the deployed condition.

9. The apparatus according to claim 1, wherein the wing assembly is configured to reversibly expand telescopically along the second direction transverse to the first direction.

10. The apparatus according to claim 9, wherein the wing assembly comprises a primary wing portion and a secondary wing portion, the wing assembly being configured to reversibly expand by movement of the secondary wing portion laterally outwardly the respect to the primary wing portion.

11. The apparatus according to claim 10, wherein the secondary wing portion is slidably received within the primary wing portion, the wing assembly being configured to reversibly expand telescopically by movement of the secondary wing portion outwardly from within the primary wing portion.

12. The apparatus according to claim 10, wherein the secondary wing portion comprises first and second secondary wing components configured to move outwardly from respective laterally opposite ends of the primary wing portion when the apparatus transitions from the stowed to the deployed conditions to cause the wing assembly to reversibly expand.

13. The apparatus according to claim 4, further comprising a drive portion configured to cause the wing assembly to reversibly deploy from the stowed condition to the deployed condition.

14. A controller for controlling the apparatus according to claim 1, the controller being configured to cause the apparatus to assume the stowed condition or the deployed condition in dependence at least in part on at least one input signal.

15. A vehicle comprising the apparatus according to claim 1.

16. A method of increasing traction between a vehicle and ground, the method comprising:
  causing an active wing apparatus of the motor vehicle to reversibly deploy a wing assembly thereof upwardly in a first direction from a stowed condition to a deployed condition;
  causing a lifting mechanism to lift the wing assembly when the apparatus is reversibly deployed in the first direction from the stowed condition to the deployed condition,
  wherein causing the lifting mechanism to lift the wing assembly comprises causing at least two lifting arms, each having respective first and second ends, the second end of each lifting arm being pivotably coupled to the wing assembly, the first end of each lifting arm being pivotably coupled to a mounting portion coupled to a portion of a body of the vehicle, to rotate about the first and second ends causes lifting of the wing assembly;
  causing a cover panel provided below the wing assembly to be raised and lowered between stowed and deployed conditions when the apparatus transitions between the stowed and deployed conditions, in the deployed condition the cover panel being arranged to at least partially cover a recess formed in a body portion of the vehicle within which at least a portion of the apparatus is provided when the apparatus is in the stowed condition,
  the lifting arms being configured to protrude through cover panel apertures formed in the cover panel to enable connection of the wing assembly to the portion of the vehicle body,
  the cover panel further comprising a pair of infill cover panels, the infill cover panels being slidably coupled to the cover panel and slidably movable between open and closed conditions,
  wherein, when the apparatus is in the stowed condition the infill cover panels each assume an open position and when the apparatus is in the deployed condition the infill cover panels each assume a closed position, in the closed position the infill cover panels being arranged to close the cover panel apertures to a greater extent than in the open position.

* * * * *